29-11 AU 324 EX
FIP8209 OR RE 20,089
Examiner
461539
BEST AVAILABLE COPY
Sept. 1, 1936. J. F. HINES Re. 20,089
Orig. 2,004,810
METHOD OF MAKING HINGES
Original Filed July 10, 1934
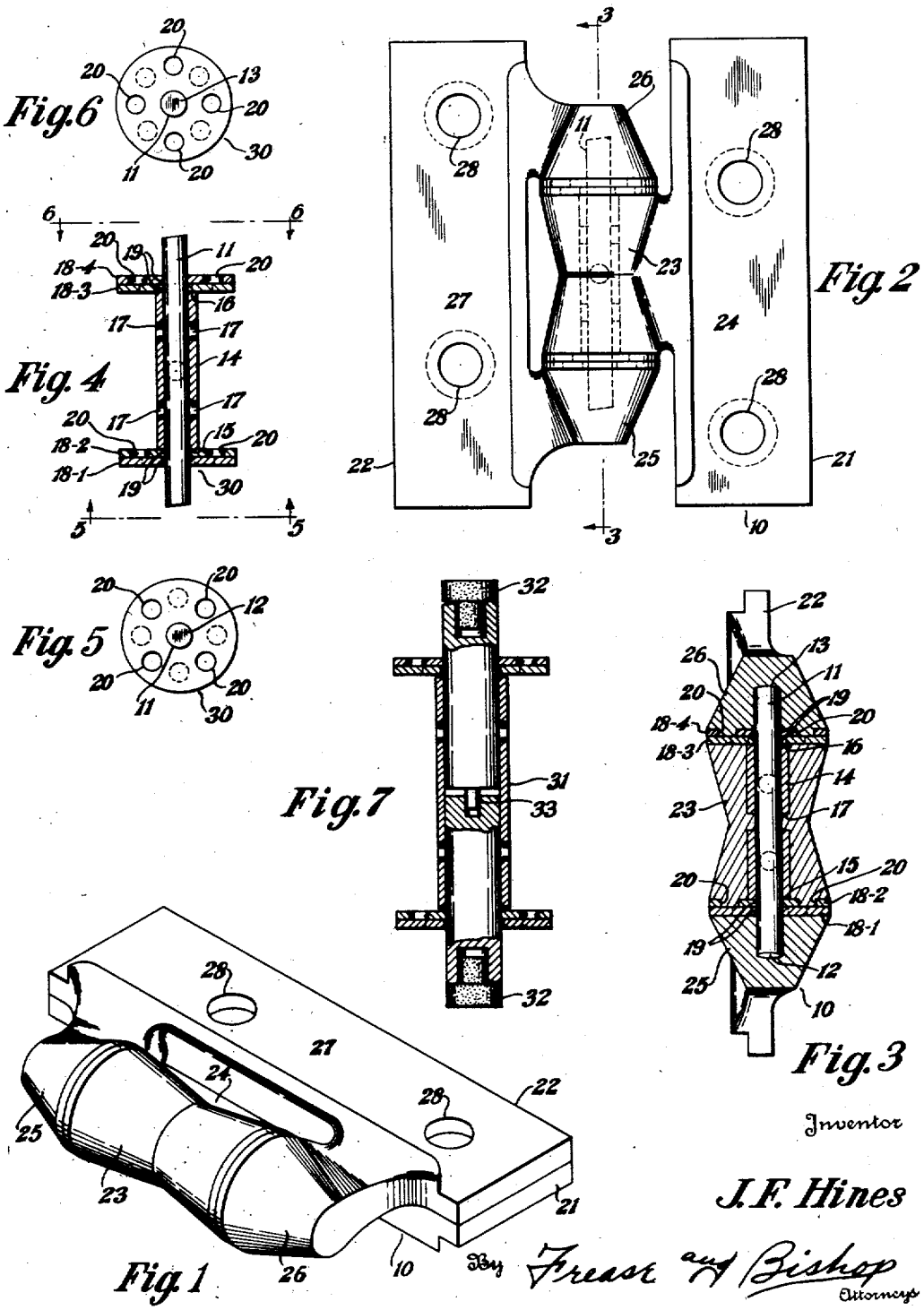
Inventor
J. F. Hines
By Frease and Bishop
Attorneys Examiner Reissued Sept. 1, 1936

Re. 20,089

UNITED STATES PATENT OFFICE 20,089

METHOD OF MAKING HINGES

James F. Hines, Lakewood, Ohio, assignor to Russell J. Hines, Lakewood, Ohio

Original No. 2,004,810, dated June 11, 1935, Serial No. 734,489, July 10, 1934. Application for reissue October 18, 1935, Serial No. 46,539

14 Claims. (Cl. 29—11)

The invention relates to hinges, and to methods for making the same.

Hinges available prior to the present improvements sag in use, squeak, rust, and their joints are subject to moisture and/or dust, because of imperfect fitting and excessive clearance between the hinge leaves and pins.

The imperfect fitting and excessive clearance between the leaves and pins of usual hinges arises from the fact that the cost of and the time required for manufacturing usual hinges according to usual methods so as to attain precision fitting and clearance between the hinge leaves and pins would be prohibitive.

The objects of the present improvements include the provision of an improved hinge which is sagless, squeakless, rustless and proof against the exposure to dampness and/or dust in its joints, and which is adapted for economical and rapid manufacture.

Further objects of the present improvements include the provision of an improved method of making the improved hinge of the invention. Although specifically shown and described as applied to a hinge, it will be appreciated by those skilled in the art that the invention is applicable to pintle joints generally.

The foregoing and other objects are attained by the improvements, apparatus, parts, combinations, sub-combinations, and methods which comprise the present invention, and the nature of which is set forth in the following general statement, and preferred embodiments of the improvements, apparatus, parts, combinations, and sub-combinations, together with their mode of use, and a preferred method of making the same, are set forth in the following description, and the improvements, apparatus, parts, combinations, sub-combinations, and methods of the invention are particularly and distinctly pointed out and set forth in the appended claims forming part hereof.

The nature of the improved hinge of the present invention may be described in general terms as including a hinge pin which may be made of a length of suitable material, for example steel rod preferably of stock size, the ends of the pin desirably but not necessarily being formed out of square. A shorter sleeve of preferably seamless tubing is rotatably located on the pin and may be of suitable metal or other material, for example bronze or steel, and in the preferred embodiment pairs of brass, bronze or steel washers are located with the pin rotatably fitting in their central apertures, each pair being located at one end of the sleeve with one of the washers in abutment with the adjacent end thereof.

The sleeve and washers are preferably provided as by means of apertures formed in their walls, with engaging surfaces, and the hinge, knuckles and leaves are cast of metal which may be aluminum alloy about the pin, sleeve, and washers so that the knuckle of one leaf engages the sleeve and the inner washers and the knuckles of the other leaf engage the pin and the outer washers.

The nature of the improved method for making the improved hinge of the present invention may be described in general terms as pre-assembling the pin, sleeve, and washers in their desired permanent locations with respect to each other, placing the pre-assembled pin, sleeve and washers as a core unit in a mold having knuckle- and leaf-forming cavities, and then pouring molten material perferably but not always necessarily having a lower melting point than that of the pin, sleeve, and washers into the mold cavities and about the pin, sleeve and washers, and on cooling the cast material shrinks wax tight on the pin, sleeve, and washers, and forms the improved hinge.

For many purposes the material of the several parts of the hinge may be metallic, and the cast metal forming the hinge leaves preferably has a lower melting point than that of the metal of the pin, sleeve, and washers.

In the case of relatively large hinges, in order to provide for necessary shrinkage of the leaf material in cooling, it is desirable to associate destructible cores with the opposite ends of the hinge pin and to cast the hinge leaf engaging the outer ends of the hinge pin about the cores as well as the outer ends of the hinge pin; or to provide telescoping means in the hinge pin intermediate its ends, to premit it to contract endwise with the cast material.

Preferred embodiments of the improved hinge and of the pin, sleeve, and washer unit thereof, are illustrated in the accompanying drawing forming part hereof, in which Figure 1 is an isometric view of one embodiment of the improved hinge with the leaves in closed position;

Fig. 2 is a plan view thereof with the leaves in open position;

Fig. 3 is a longitudinal sectional view thereof as on line 3—3, Fig. 2;

Fig. 4 is a detached view of the pin, sleeve, and washer unit, with the sleeve and washers shown in longitudinal axial section;

Fig. 5 is an end view thereof looking in the direction of the arrows 5—5, Fig. 4;

Fig. 6 is an end view thereof looking in the direction of the arrows 6—6, Fig. 4; and Fig. 7 is a view similar to Fig. 4 illustrating a pin, sleeve, and washer unit for a large hinge, with cores applied to the opposite ends of the hinge pin, and also telescoping means in the hinge pin, for permitting proper shrinking of the cast material forming the leaf engaging the outer ends of the hinge pin.

Similar numerals refer to similar parts throughout the several views.

The embodiment of the improved hinge illustrated in the drawing is indicated generally by 10 and includes a hinge pin 11 which is made of a length of round rod, which may be a steel rod and is preferably of a stock size, and the end faces 12 and 13 of the pin 11 are for the purpose of the invention preferably formed out of square with the cylindric longitudinal outer surface of the pin, as by diagonally cutting the rod from which the pins 11 are formed.

A sleeve 14 rotatably fits on the pin 11, and the sleeve 14 is shorter than the pin 11 and the end faces 15 and 16 of the sleeve 14 are square with its cylindrical inner and outer longitudinal surfaces.

The sleeve 14 has a plurality of engaging elements, for example apertures 17, formed on its surface.

Sets of washers 18—1 and 18—2, and 18—3 and 18—4 fit on the outer ends of the pin 11, the washers having the same external diameters, and having central circular apertures 19 for fitting on the pin 11. Opposite faces of the washers 18—1 and 18—2 thrust abut against each other. The inner face of the washer 18—2 abuts against the end face 15 of the sleeve 14. Similarly the opposite faces of the washers 18—3 and 18—4 thrust abut against each other and the inner face of the washer 18—3 abuts against the end face 16 of the sleeve 14.

Each washer has a plurality of engaging elements, for example apertures 20, formed on its surface.

The hinge 10 furthermore includes leaves 21 and 22, ordinarily one-piece, which may be made of cast aluminum alloy, and the one-piece leaf 21 includes a tubular portion 23 which surrounds the sleeve 14 and engages the apertures 11 of the sleeve 14, and the opposite ends of the tubular portion 23 abut the inner faces of the washers 18—2 and 18—3 and engage the apertures 20 thereof.

The hinge leaf 21 furthermore may include a connector plate 24 which extends from one side of the tubular portion 23.

The hinge leaf 22 includes end caps 25 and 26; and the end cap 25 surrounds and engages the outer end of the hinge pin 11 beyond the washer 18—1 and engages the apertures 20 thereof; and similarly the end cap 26 surrounds and engages the other end of the hinge pin 11 beyond the washer 18—4, and abuts the outer face of the washer 18—4 and engages the apertures 20 thereof.

The hinge leaf 22 furthermore may include a connector plate 21 extending from one side of the end caps 25 and 26.

The connector plate 24 of the hinge leaf 21 and the connector plate 27 of the hinge leaf 22 are provided as illustrated with apertures 28 whereby the hinge leaves may be connected as by bolts or screws with the members or parts (not shown) to be hinge connected by the hinge 10.

The improved hinge 10, (in the smaller sizes) is preferably made by forming a core unit indicated generally by 30 in Figs. 4, 5 and 6, and which includes the pin 11 with the sleeve 14 and the washers 18—1 and 18—2, and 18—3 and 18—4 positioned thereon in the desired permanent locations with respect to one another, each set of washers being arranged so that the engaging apertures 20 thereof, where apertures are used as the engaging means, do not register with one another, as best shown in Figs. 5 and 6.

The core unit 30 is then placed as a core in mold cavities of a mold, not shown, the cavities being formed to make the hinge leaves 21 and 22.

Molten metal, as aluminum alloy in the hinge 10, is then poured into the mold cavities, casting the leaves 21 and 22, and as the metal of the leaves cools, the leaves contract and wax tight engagement of the tubular portion 23 of the leaf 24 is effected with the sleeve 14 and the inner washers 18—2 and 18—3, and similar wax tight engagement of the end caps 25 and 26 is effected with the end portions of the hinge pin 11 and their out of square end faces and with the end washers 18—1 and 18—4, the apertures 17 and 20, or other means employed, providing engaging surfaces for the cast material.

In the hinge 10 the aluminum alloy forming the leaves 21 and 22 has a lower melting point than the hinge pin 11 and the bronze sleeve 14 and the round washers 18—1, 18—2, 18—3 and 18—4; and in any of the improved hinges of the present invention, the melting point of the cast material for forming the leaves may be lower than the melting point of the hinge pin, sleeve, and washers. Accordingly, when it is desired to cast steel leaves, a pin, sleeve, and washers of nickel iron may be used; and for malleable iron leaves, the pin, sleeve, and washers may be made of steel.

It will be understood, however, that the body of the metal in the hinge pin and in the respective washers, is so considerable, as compared with the amount of cast material which may contact through the apertures with the bearing surfaces; that the cast material will chill and freeze so quickly that it will not adhere to the bearing surfaces, even though the melting point of the cast material may not be lower than the melting point of the hinge pin, the sleeve, or the washers.

In making hinges of such a size that the shrinkage of the cast material upon the pin is not an appreciable factor, no provision to accommodate such shrinkage is required. However, in larger sizes it is desirable, and may be necessary, to accommodate such shrinkage. Examples of ways of accomplishing this are cores for crushing at the ends of the pins, or telescoping means interposed between the ends of the pins, or both, as illustrated in Fig. 7. The end cores, when used, are preferably of mushroom shape, as illustrated at 32, fitting somewhat loosely into appropriate sockets, which sockets have some free space to receive the crushed material. The telescoping arrangement, also shown in Fig. 7, has the pin and socket connection 33 intermediate the pin ends. The two sections of the pin are appropriately spaced within the sleeve 31 and the socket is sufficiently deep to allow for inward movement of the pin. When this telescoping arrangement is used, it is desirable to space the washers the proper distance from the end of the sleeve, although such spacing is not absolutely essential because the washers ordinarily have a sliding fit upon the sleeve.

Examine

It will be appreciated that the amount of allowance for shrinkage, and the sizes of joints in which it becomes necessary to allow for shrinkage, will vary according to the properties of the material employed. As an illustration, using steel pins and cast aluminum, I have found it unnecessary to make any accommodation for shrinkage where the pins are under two inches in length. In hinges having pins ranging between about 2 and 8 inches, the mushroom headed cores 32 are desirable; and in hinges having pins on the order of 12 inches long or more, the telescoping arrangement is considered best.

The invention has been described more particularly with reference to hinges having all the parts made of steel. Steel tubing and steel washers of proper thickness are preferably used when the leaves are cast of grey or malleable iron or steel. Copper, brass or bronze washers, however, are preferably used when the leaves are cast of non-ferrous materials, such as aluminum, hard rubber, glass, bakelite and the like.

It is also desirable to coat the sleeve, pin and washer unit with lamp black or similar material, in accordance with usual foundry practice, to prevent presence of moisture on the core unit, and thus insure firm and complete junction between the core unit and the cast metal.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated by the following claims.

I therefore particularly point out and distinctly claim as my invention:—

1. The method of making a hinge and the like which includes assembling a core unit including a pin, a sleeve rotatably located on the pin, the pin being longer than the sleeve and having ends extending beyond the opposite ends of the sleeve, and pairs of abutting washers provided with central apertures rotatably fitting on the pin, each pair being located at one end of the sleeve and one of the washers of each pair abutting the adjacent end of the sleeve, placing the core unit in a mold having one piece leaf forming cavities, and casting one piece leaves in the mold cavities, one leaf engaging the sleeve and the washers abutting the ends thereof, and the other leaf engaging the outer ends of the pin and the other washers.

2. The method of making a hinge and the like which includes assembling a core unit including a pin, a sleeve rotatably located on the pin, the pin being longer than the sleeve and having ends extending beyond the opposite ends of the sleeve, and pairs of abutting washers provided with central apertures rotatably fitting on the pin, each pair being located at one end of the sleeve and one of the washers of each pair abutting the adjacent end of the sleeve, the pins, sleeves, and washers being made of metal, placing the core unit in a mold having one piece leaf forming cavities, and casting one piece leaves in the mold cavities of metal having a lower melting point than the metal of the pin, sleeve, and washers, one leaf engaging the sleeve and the washers abutting the ends thereof, and the other leaf engaging the outer ends of the pin and the other washers.

3. The method of making a hinge and the like which includes assembling a core unit including a pin, a sleeve rotatably located on the pin, and pairs of abutting washers provided with central apertures rotatably fitting on the pin, each pair being located at one end of the sleeve and one of the washers of each pair abutting the adjacent end of the sleeve, placing the core unit in a mold having one piece leaf forming cavities, and casting one piece leaves in the mold cavities, one leaf engaging the sleeve and the washers abutting the ends thereof, and the other leaf engaging the outer ends of the pin and the other washers.

4. The method of making a hinge or the like which includes assembling a core unit including a pin, a sleeve rotatably located on the pin, and pairs of abutting washers provided with central apertures rotatably fitting on the pin; each pair being located at one end of the sleeve and one of the washers of each pair abutting the adjacent end of the sleeve, the pins, sleeves, and washers being made of metal, placing the core unit in a mold having one piece leaf forming cavities, and casting one piece leaves in the mold cavities of metal having a lower melting point than the metal of the pin, sleeve and washers, one leaf engaging the sleeve and the washers abutting the ends thereof, and the other leaf engaging the outer ends of the pin and the other washers.

5. The method of making a hinge or the like which includes assembling a core unit including a pin, a sleeve rotatably located on the pin, and pairs of abutting washers provided with central apertures rotatably fitting on the pin; each pair being located at one end of the sleeve and one of the washers of each pair abutting the adjacent end of the sleeve, the pins, sleeves, and washers being made of metal, placing the core unit in a mold having one piece leaf forming cavities, and casting one piece leaves in the mold cavities.

6. The method of making a hinge and the like which includes assembling a core unit including a pin, a sleeve rotatably located on the pin, and washers provided with central apertures rotatably fitting on the pin, said washers being located at the ends of the sleeve and abutting the adjacent end of the sleeve, placing the core unit in a mold having leaf forming cavities, and casting leaves in the mold cavities, one leaf engaging the sleeve and the washers abutting the ends thereof, and the other leaf engaging the other washers.

7. The method of making a hinge or the like which includes assembling a core unit of preformed elements and surrounding the same with a solid covering applied in an initially fluent condition, said core unit including a pin, a sleeve rotatably located on the pin, and pairs of abutting washers provided with central apertures rotatably fitting on the pin; each pair being located at one end of the sleeve and one of the washers of each pair abutting the adjacent end of the sleeve, the pins, sleeves, and washers being made of material resistant to disintegration by the covering material, placing the core unit in a mold having a plurality of cavities separated by said washers and pouring the covering into said mold cavities.

8. The method of making a hinge and the like which includes assembling a core unit including a pin, a sleeve rotatably located on the pin, and centrally-apertured washers rotatably fitting on the pin, said washers being located abutting the respective ends of the sleeve, placing the core unit in a mold having a cavity surrounding the sleeve and cavities of which the washers form wall elements, and casting bodies of material initially fluent but ultimately solid around the sleeve and upon the washers, the bodies upon the washers and surrounding the sleeve being mutually relatively movable.

9. The method of making a hinge joint which comprises assembling as a core unit a pin with a sleeve of less length than the pin rotatable thereon and other elements thereon also rotatable with respect to the pin and with respect to the sleeve and abutting the sleeve ends, placing the core unit in a mold having cavities surrounding the sleeve and cavities surrounding the other elements, and casting material into said mold cavities to surround and engage the sleeve and the other elements respectively, the cast material upon the sleeve being discontinuous from the cast material upon the other elements.

10. The method of making a hinge joint which comprises assembling as a core unit a central axial element; said element being adapted for reduction in length without distortion from alignment, said unit further including a sleeve on said element, transversely disposed members at the ends of said sleeve, and other transversely disposed members on said central axial element beyond and in interfacial bearing relationship with said first-named transversely-disposed members; placing said core unit in a mold and casting material into said mold to surround and engage the core unit, the cast material being rendered discontinuous by and at said transversely disposed elements.

11. The method of making hinge joints which comprises assembling a surrounding member in rotatable relation upon an axial member, applying in longitudinal extension of said axial member elements adapted to be crushed into less than their original length, providing said surrounding member and said axial member each with laterally extending elements movably contacting face to face in pairs, placing said assembly in a mold, and casting material into said mold upon said assembly, the cast material upon said surrounding member being separated from that upon said axial member by said pairs of laterally extending elements.

12. The method of making hinge joints which comprises assembling a surrounding member rotatably upon a longer axial member, said axial member including means whereby it may be reduced in length by pressure upon its ends, providing said surrounding member and said axial member each with laterally extending elements movably contacting face to face in pairs, and casting material upon said assembly while preventing juncture of adjacent portions of said material at said pairs of laterally extending elements.

13. The method of making hinge joints which comprises assembling a surrounding member rotatably upon a longer axial member, said axial member including a section adapted to be telescoped by end thrust, providing said surrounding member and said axial member each with laterally extending elements movably contacting face to face in pairs, and casting material upon said assembly while preventing juncture of adjacent portions of said material at said pairs of laterally extending elements.

14. The method of making a hinge joint which comprises assembling as a core unit a pin with a sleeve of less length than the pin rotatable thereon and other elements thereon also rotatable with respect to the pin and located adjacent the sleeve ends, placing the core unit in a mold having cavities surrounding the sleeve and cavities surrounding the other elements, and casting material into said mold cavities to surround and engage the sleeve and the other elements respectively, the cast material upon the sleeve being discontinuous from the cast material upon the other elements.

JAMES F. HINES.